United States Patent [19]
Walker et al.

[11] Patent Number: 5,945,653
[45] Date of Patent: *Aug. 31, 1999

[54] SYSTEM AND METHOD FOR ESTABLISHING AND EXECUTING FUNCTIONS TO AFFECT CREDIT CARD ACCOUNTS AND TRANSACTIONS

[75] Inventors: Jay S. Walker, Ridgefield; Sanjay K. Jindal, Wilton; Daniel E. Tedesco, Monroe, all of Conn.

[73] Assignee: Walker Asset Management Limited Partnership, Stamford, Conn.

[ * ] Notice: This patent issued on a continued prosecution application filed under 37 CFR 1.53(d), and is subject to the twenty year patent term provisions of 35 U.S.C. 154(a)(2).

[21] Appl. No.: 08/883,308

[22] Filed: Jun. 26, 1997

[51] Int. Cl.⁶ ........................................................ G06F 7/00
[52] U.S. Cl. ............................ 235/380; 235/381; 235/383
[58] Field of Search .................................... 235/380, 383, 235/381; 283/51, 57, 60.1

[56] References Cited

U.S. PATENT DOCUMENTS

| | | | |
|---|---|---|---|
| 4,882,675 | 11/1989 | Nichtberger et al. ................... | 364/401 |
| 5,010,485 | 4/1991 | Bigari ..................................... | 235/379 |
| 5,173,594 | 12/1992 | McClure ................................. | 235/380 |
| 5,310,997 | 5/1994 | Roach et al. ........................... | 235/375 |
| 5,353,218 | 10/1994 | De Lapa et al. ....................... | 364/401 |
| 5,559,313 | 9/1996 | Claus et al. ............................ | 235/380 |
| 5,649,118 | 7/1997 | Carkisle et al. ........................ | 395/241 |
| 5,684,965 | 11/1997 | Pickering ............................... | 395/234 |

OTHER PUBLICATIONS

John Kostrzewa, "Two Banks Offer Credit with a Philanthropic Twist", Providence Journal–Bulletin, Apr. 10, 1996 at p. H1.

Mary Ann McNulty, "First Bank is First Out With Relocation Card", Business Travel News, Apr. 17, 1995 at p. 16.

Carol Smith, "Mastercard to Itemize Hotel Charges for Firms", Los Angeles Times, Sep. 28, 1995 at p. D4.

"MasterCard Exclusives for College" (http://www.mastercard.com/cgi–bin/college_form), download date: Oct. 31, 1997.

Brochure: "Introducing the Holiday Cards That Will Save You Money This Season", MasterCard, 1997.

Brochure: "Only One Thing Can Make Your First USA Platinum Card This Exciting", First USA, 1997.

*Primary Examiner*—Anita Pellman Gross
*Assistant Examiner*—Drew A. Dunn
*Attorney, Agent, or Firm*—Robert R. Lech; Charles A. Rattner

[57] ABSTRACT

A system and process for establishing a function having a corresponding function identifier. The function is adapted to be processed during a transaction such as a point-of-sale transaction that may involve a credit card. The system and process involve identifying an account having an account identifier, establishing a function having a function identifier, and receiving a transaction request including the account identifier, a transaction amount, and the function identifier. The system and process also process the transaction in accordance with the function to affect the transaction and, possibly, the transaction amount. An affect on the account is also contemplated. Additionally, the system and process are adapted to allow message to be presented by customers and credit card holders during a transaction for later appearance on a credit card statement or other notice.

26 Claims, 12 Drawing Sheets

| CARDHOLDER ACCOUNT NUMBER | NAME | ADDRESS | PHONE NUMBER | ORIGINAL CREDIT LINE | AVAILABLE CREDIT LINE |
|---|---|---|---|---|---|
| 2222-3333-4444-5555 | TIM JOHNSON | 99 MAIN ST. HOMETOWN, CT 22222 | (333) 444-5555 | $2,000 | $1,233 |
| 9999-9999-9999-9999 | SUE CARDHOLDER | 10 CENTER ST. ROCKPORT, NJ 99999 | (999) 111-2222 | $3,500 | $0 |
| 7777-3333-2222-1111 | JOHN CHARGER | 123 ELM ST. SMALL TOWN, USA 00551 | (222) 333-5454 | $10,000 | $9,700 |

FIG. 3

| MERCHANT ID NUMBER | MERCHANT NAME | MERCHANT ADDRESS |
|---|---|---|
| 12345 | MACY'S | 5 MAIN ST. TOWN, CT |
| 65478 | STAPLES | 2 PINE ST. CITY, NY |
| 58749 | CALDOR | 123 PURPLE AVE. BLUE, CT |

FIG. 4

| ASSIGNEE IDENTIFIER | ASSIGNEE | FUNCTION IDENTIFIER | FUNCTION OPERATION | STATUS |
|---|---|---|---|---|
| R1: ACCOUNT NUMBER 2222-3333-4444-5555 | TIM JOHNSON | BX1239BC | 5% OFF | REDEEMED |
| R2: MERCHANT ID NO. 12345 | MACY'S | BXC45697 | 5% REBATE | NOT REDEEMED |
| R3: ACCOUNT NUMBER 9999-9999-9999-9999 | SUE CARDHOLDER | MESS#TAX | MESSAGE: "TAX DEDUCTION" | REDEEMED |
| R4: ACCOUNT NUMBER 7777-3333-2222-1111 | JOHN CHARGER | 1234 | $10.00 OFF | REDEEMED |
| R5: ACCOUNT NUMBER 4444-4444-4444-4444 | SALLY THOMAS | NO INTEREST FOR 6 MONTHS | NO INTEREST FOR 6 MONTHS | NOT REDEEMED |

| ACCOUNT NUMBER | DATE | TIME | TRANSACTION AMOUNT | TRANSACTION DESCRIPTOR | MERCHANT ID NUMBER | MERCHANT NAME |
|---|---|---|---|---|---|---|
| 2222-3333-4444-5555 | 1/1/97 | 10:00AM | $98.00 | CODE NUMBER BX1239BC | 58749 | CALDOR |
| 9999-9999-9999-9999 | 1/1/97 | 12:00PM | $50.00 | "TAX DEDUCTION" | 65478 | STAPLES |
| 7777-3333-2222-1111 | 5/1/97 | 1:54PM | $250.00 | 1234 | 12345 | MACY'S |
| 4444-4444-4444-4444 | 5/28/97 | 2:35PM | $1,250.00 | NO INTEREST FOR 6 MONTHS | 65478 | STAPLES |

FIG. 6

SYSTEM AND METHOD FOR ESTABLISHING AND EXECUTING FUNCTIONS TO AFFECT CREDIT CARD ACCOUNTS AND TRANSACTIONS

BACKGROUND OF THE INVENTION

1. Field of the Invention

The present invention relates to the field of credit cards and, more particularly, to functions that may be established and executed to affect credit card accounts and transactions.

2. Description of the Related Art

Credit card transaction processing systems are well known. For example, the typical credit card transaction processing system involves a cardholder, a merchant, a credit card processor, and a credit card issuer. Usually, the cardholder presents goods or services to a merchant at a point-of-sale station where the merchant calculates a purchase price and asks the cardholder for payment. Thereafter, the merchant processes the cardholder's credit card through a point-of-sale unit or terminal which is configured to transmit transaction information such as the amount of the transaction, the credit card number, etc., to the credit card issuer for authorization. The transaction information is directed to the issuer, who is identified by the first four digits of the credit card number, either directly through a network connection or indirectly through a credit card processing service.

If the cardholder's account is in a state that is sufficient to accept charges contemplated by the transaction, the credit card issuer will authorize the transaction by generating and transmitting an authorization code to the merchant. At the same time, the credit card issuer usually places a hold or "freezes" the available credit line on the cardholder's account for the amount of the transaction. After receipt of an authorization code, a sales draft, slip or receipt is often printed out by the point-of-sale unit or some other device such as a cash register. Thereafter, the cardholder signs the draft acknowledging his obligation to reimburse the credit card issuer for the amount of the transaction. At this point, the merchant can collect payment for goods or services from the credit card issuer.

The aforementioned credit card transaction processing approach is functionally limited in that only basic sets of data can be collected and processed at the point-of-sale (e.g., credit card number, transaction amount, etc.). As such, various proposals have been made to enhance the credit card transaction and account processing systems and, in particular, to enhance the credit card processing system's ability to provide benefits to credit card issuers, credit card processors, merchants, and cardholders. However, no proposals to date have enabled either cardholders or merchants to spontaneously alter what transactions are to be affected by a discount or other offer such as a financing option.

For example, the U$AVE program offered by First Data Corporation (FDC), a credit card processor, is a program wherein merchants pre-arrange offers with FDC's issuers that allow targeted cardholders to receive discounts redeemable via credit card payment at a point of sale. This program requires merchants to first register with FDC by specifying target market parameters like zip code, purchase history, available credit line, the discount function (e.g., percent-off, dollars-off, etc.), and other purchase parameters (e.g., first purchases, all purchases, or phased-in purchases). FDC then sends out a customized statement of offers to cardholders of issuing banks that have agreed to participate in this program. At the time of a point-of-sale transaction, the merchant provides FDC with transaction information including a cardholder's account number. FDC then checks for any pre-registered merchant discounts and automatically applies the discounts to qualifying transactions.

From the merchant's perspective, the U$AVE program is not capable of offering the merchant the ability to offer discounts or financing options on an ad hoc basis. Such an ability would help merchants achieve incremental sales from those customers who are ready to buy but may need an extra purchase incentive. For example, customers who are concerned about high interest rates might make a purchase if they could finance their purchase interest-free for six or twelve months. U$AVE does not provide the merchant with the ability to make such spontaneous offers on an individual basis. The merchant is left with the conventional alternative of inconveniencing the customer to apply for a store credit card which the customer may not want and may not qualify for.

From the customer's perspective, the U$AVE Program restricts the customer's ability to receive discounts in several ways. The customer cannot choose "when" to receive the offered discount. For example, if a merchant offered 10% off, the customer would generally prefer to receive 10% off on a major purchase to maximize the benefit of the offered discount. U$AVE, however, restricts the application of the discount to the first qualifying purchase, with the unintended result of discouraging the customer from making minor intervening purchases at the merchant and thus depressing merchant sales. Moreover, U$AVE does not allow the customer to choose "which" merchant he would prefer to receive the discount from. Thus, the U$AVE program significantly limits customer choice. It presents the customer with fixed offers that are exercised, regardless of the customer's choice, simply by the presentation and use of the appropriate credit card.

The MASTERCARD PURCHASING CARD program offered by MASTERCARD allows merchants to provide supplemental information to credit card issuers via specially configured, non-standard point-of-sale units that are unique to the program. MASTERCARD cardholders can request that information such as a merchant category code, a supplier name, special accounting codes, supplier tax information, a 1099 status, a supplier zip code, quantities, product codes, product descriptions, freight amounts and duty amounts, be included on customer billing statements. This system is limited as it requires specially configured point-of-sale hardware. Furthermore, the supplemental information that cardholders can record on their billing statements is limited to fields specified by MASTERCARD, for example, supplier's 1099 status, zip code or tax information. In short, the system simply provides additional information to the credit cardholder without providing any additional functionality.

AMERICAN EXPRESS "EXPRESS REWARDS" and "CUSTOM EXTRAS" are programs that use credit card transaction processing systems to deliver enhanced value to their cardholders. With these programs, merchants can track AMERICAN EXPRESS cardholder purchase behavior and then reward customers for their loyalty based on that behavior. The EXPRESS REWARDS program automatically discounts purchase amounts at a cash register while the CUSTOM EXTRAS program alerts cardholders to savings from particular merchants on cardholder billing statements. Similar to U$AVE, these programs allow merchants to set criteria for defining cardholder discount eligibility. The criteria merchants may use to determine a cardholder's eligibility is limited to the cardholder's past purchasing performance.

Once a cardholder's historical transaction data meets the pre-defined preference parameters, AMERICAN EXPRESS notifies the merchants via a POS system by transmitting a message indicating "preferred customer." The merchant can then discount the purchase at the POS. Consequently, the AMERICAN EXPRESS programs are merchant driven and are not capable of responding to any customer preferences or choices.

Another example of a limited enhancement to conventional credit card transaction processing systems is the inclusion of merchant messages on customer billing statements. Merchant messages involve systems operated by merchants, processors, and issuers to allow the inclusion of text-based messaging on customer billing statements. Such messages serve to communicate supplemental or new information related to goods or services purchased and may include customer service telephone numbers, product information, or advertisements. The usefulness of such information is limited as cardholders cannot specify the information that appears on their billing statements.

Each of the aforementioned systems and processes require either specially configured hardware, parallel transaction processing systems, or the pre-arrangement of transaction parameters. As such, the need for additional systems and processes can be costly, can diminish the intended value of programs requiring such additional systems and processes, and can limit the intended benefits to merchants and consumers. More particularly, previously proposed enhancements to credit card and related processing systems have not allowed cardholders and merchants to directly control the effects on a credit card account. Previously proposed enhancements also have not allowed cardholders to transmit data regarding transactions to their credit card issuers for later appearance on their credit card billing statements using the conventional POS infrastructure.

Accordingly, the shortcomings associated with the related art have heretofore not been adequately addressed. The present invention addresses such problems by providing a system and processing approach that have not previously been proposed.

SUMMARY OF THE INVENTION

In view of the deficiencies of the related art discussed above, it is therefore the central object of the present invention to provide a system and a process for establishing and carrying out functions adapted to affect credit card transactions. The functions can be discounts, rebates, special purchase operations (e.g., special interest rate incentives or other custom financing), special customer-specified messages, etc., which provide benefits to credit card issuers, merchants, and consumers.

The present invention enables merchants to offer customers a variety of financing options on an ad hoc basis. For example, a merchant might wish to offer an interest free purchase option to a customer allowing him to conveniently make a major purchase using one of his existing credit card accounts. The customer is not forced to apply for a store credit card simply to obtain better financing terms such as an interest free period. The customer and the merchant do not have to waste resources and time to process a store credit card application which the customer may not want or need in the first place. More importantly, the merchant does not have to risk losing a sale because a customer that already had available lines of credit with his credit cards was denied a store credit card.

The present invention enables the merchant to simply establish a function, with selected credit card issuers, which instructs the issuers to provide interest free billing to the cardholder for the specified time period, and to bill the net present value of the calculated interest to the merchant, or deduct such value from the settlement of the consumer's charge made with the merchant. The present invention uses and enhances the existing relationships between the cardholder, the merchant and the issuer, providing a benefit to all concerned parties. The cardholder and the merchant benefit by concluding a sale efficiently and conveniently, the issuer benefits by getting incremental charge volume with prepaid interest.

Consequently, it is another object of the present invention to allow credit card issuers, merchants, and customers to take advantage of established functions through use of corresponding function identifiers which may easily identify functions to be carried out to affect transactions and accounts.

It is still another object of the present invention to enable conventional credit card transaction processing systems and those employing other state-of-the art communications systems to achieve, derive, and process data received at the point-of-sale during a transaction and to utilize that data to affect the transaction.

It is still a further object of the present invention to provide a process for allowing functions to be established and carried out by credit card issuers utilizing conventional point-of-sale and credit card transaction processing systems, and other communications systems.

It is still another object of the present invention to provide a process for allowing functions to be established by merchants which are ultimately carried out by credit card issuers utilizing conventional point-of-sale and credit card transaction processing systems, and other communications systems.

It is still another object of the present invention to allow multiple functions to be executed to affect a transaction in multiple ways.

It is still another object of the present invention to cause multiple functions be carried out in any order to realize combined effects.

It is yet another object of the present invention to allow merchants that accept credit cards and credit card holders to enjoy added benefits associated with establishing and executing functions that enhance the use of credit card cards.

The present invention achieves the aforementioned objects by providing systems and methods for establishing and processing functions adapted to affect credit card transactions and accounts. The use of functions to trigger effects on transactions and accounts and, in particular, effects on transaction amounts via conventional point-of-sale processing systems will provide significant benefits to credit card issuers, merchants, and cardholders. For example, credit card issuers can utilize such systems and methods and, in particular, those employing functions and function identifiers to incent cardholders to use their credit cards to thereby increase credit card balances and, ultimately, credit card processing fees. Moreover, credit card issuers can utilize the systems and methods provided by the present invention to incent cardholders to activate newly issued, unused credit cards. That is, the systems and methods of the present invention can be used by a credit card issuer to promote an incentive program whereby cardholders are given a percentage-off discount on their first use of their credit card when they present an activation function identifier that calls for such operation of a discount. Accordingly, credit card customers will be more likely to utilize their newly issued credit cards.

Merchants can also benefit from establishing processing functions and function identifiers as provided by the present invention. In particular, a merchant could utilize the same to purchase the use of store-based functions, from selected credit card issuers, that allows the merchant to offer specific purchase incentives to selected customers at the store, in an ad-hoc manner. For example, a merchant such as MACY's could promote a special purchase program for its cosmetics department offering its customers $25 off any purchase over $100 for cosmetics. Furthermore, as the systems and methods of the present invention may be effectively coupled with the use of conventional credit cards, consumers will not be hindered by such things as special rebate forms, coupons, or certificates to realize the benefits associated with the merchant-based special purchase promotions.

The present invention also benefits cardholders by enabling them to take advantage of easier to use discount programs and promotional offers through use of their credit cards at the place and time and transaction that they choose. Additionally, cardholders can now place personal notes directly on their billing statements that correspond to their transactions via conventional point-of-sale processing systems at the point-of-sale when transaction information is fresh in a customer's mind. Such messages may take the form of accounting codes which a customer may personally establish to track expenses such as business expenses tax deductible expenses, and the like.

These and other aforementioned objects of and the benefits associated with the present invention are achieved and realized, respectively, by providing a process for establishing and executing a function to affect a transaction that includes the steps of identifying an account having an account identifier, establishing a function having a function identifier, and receiving a request to process a transaction. The request includes the account identifier and the function identifier. The process also includes the step of processing the request in accordance with the function identifier to affect either the transaction or the account, or both.

The present invention also provides a system for establishing and executing a function to affect a transaction that includes a data processing system identifying an account having an account identifier and establishing a function having a function identifier and a communications unit coupled to the data processing system. The communications unit receives a request to process a transaction from a point-of-sale unit. The request includes the account identifier and the function identifier. The data processing system processes the request in accordance with the function identifier to affect the transaction.

The present invention also provides a process for establishing and executing a function adapted to be processed during a point-of-sale transaction involving a credit card that includes the steps of identifying a credit card account having an account identifier and establishing a function to correspond to the credit card account. The function has a corresponding function identifier. The process also involves receiving a transaction request from a point-of-sale unit maintained at a merchant station. The transaction request includes the account identifier, a transaction amount, and the function identifier. The process also involves processing the transaction in accordance with the function identifier to affect the transaction amount.

The present invention also provides a method for processing a transaction that includes the steps of receiving transaction data including an account identifier corresponding to an account, a transaction amount and a function identifier, identifying an operation corresponding to the function identifier, and performing the operation to affect the transaction amount and the account.

The present invention also provides a system for processing a point-of-sale transaction that includes the step of receiving transaction data during a point-of-sale transaction. The transaction data includes an account identifier corresponding to an account, a transaction amount, and a function identifier. The method also involves identifying an operation corresponding to the function identifier, and performing the operation to affect the transaction amount during the point-of-sale transaction.

The present invention also provides a process for issuing function identifiers adapted to be processed during a point-of-sale transaction to cause an effect to a transaction amount that includes the steps of identifying an account issued by an account issuer and which has an account owner and an account identifier, establishing a function identifier corresponding to the account, and issuing the function identifier to the account owner. The process also includes the step of issuing the function identifier to the account owner. The function identifier corresponds to the function. The function is adapted to be processed during a point-of-sale transaction by the account issuer to affect a transaction amount during the point-of-sale transaction.

The present invention also provides a method for processing a message during a point-of-sale transaction that includes the steps of receiving a transaction request during a point-of-sale transaction. The transaction request includes an account identifier corresponding to an account, a transaction amount, and a message corresponding to the point-of-sale transaction. The method also involves processing the transaction request by affecting the account based on the transaction amount and in accordance with the message.

The present invention also provides a system for processing a message code during a point-of-sale transaction that includes a communications unit receiving a transaction request from a point-of-sale unit during a point-of-sale transaction. The transaction request includes an account identifier corresponding to an account, a transaction amount, and a message code corresponding to the point-of-sale transaction. Also included in the system is a data processing system for processing the transaction request by affecting the account based on the transaction amount and in accordance with the message code.

The present invention also provides a process for initiating a point-of-sale transaction including a function identifier adapted for use in a credit card transaction processing system that includes the step of receiving transaction data which includes an account identifier corresponding to an account issued by an account issuer, a transaction amount, and a function identifier. The function identifier corresponds to an operation to be carried out by the account issuer to affect the transaction amount. The process also involves transmitting the transaction data to a clearing authority for clearing against the account and receiving an authorization status notice from the clearing authority.

The present invention also provides a method for processing a point-of-sale transaction that includes the steps of receiving transaction information including an account identifier corresponding to an account issued by an account issuer and a transaction amount, transmitting the account identifier and the transaction amount from the point-of-sale station to the account issuer and, determining if the account is associated with a function that corresponds to an operation to be carried out by the account issuer to affect the transaction amount. The function has a corresponding function identifier. The method also involves transmitting a function identifier request from the account issuer to the point-of-sale station when the account is associated with a function as determined during the determining step, requesting entry of an identifier, and transmitting the function identifier to the account issuer. The account issuer carries out the operation when the function identifier is the same as the identifier.

The present invention also provides a system for processing a point-of-sale transaction that includes a communication unit receiving transaction data from a point-of-sale unit. The transaction data includes an account identifier corresponding to an account, a transaction amount, and a function identifier. The system also includes a data processing system identifying an operation corresponding to the function identifier and performing the operation to affect the transaction amount and the account.

The present invention also provides a system for processing a point-of-sale transaction that includes a communication unit receiving transaction data from a point-of-sale unit during a point-of-sale transaction. The transaction data includes an account identifier corresponding to an account, a transaction amount, and a function identifier. The system also includes data processing system identifying an operation corresponding to the function identifier and performing the operation to affect the transaction amount during the point-of-sale transaction.

The present invention also provides a system for issuing function identifiers adapted to be processed during a point-of-sale transaction to affect a transaction amount that includes a data processing system identifying an having an account owner and an account identifier, and establishing a function corresponding to the account having a corresponding function identifier. The system also includes a distribution system issuing the function identifier to the account owner. The function identifier is adapted to be processed during a point-of-sale transaction by the data processing system to identify the function. The function is configured to affect a transaction amount during the point-of-sale transaction.

The present invention also provides a billing statement issued by a credit card issuer to an account owner that includes a transaction section for indicating transaction details related to a transaction involving an account owned by the account owner, an account detail section for indicating account details related to the account, and a message section including an indication of a function identifier for use by the account owner. The function identifier adapted to be used by the account owner to cause the credit card issuer to affect a future transaction in which the account owner uses the account.

Finally, the present invention provides a method for facilitating the clearance of a point-of-sale transaction that includes the steps of receiving transaction data including an account identifier, a transaction amount, and a function identifier. The account identifier corresponds to an account issued by an account issuer. The function identifier corresponds to a function adapted to be processed by the account issuer to affect the transaction amount. The method further includes the steps of transmitting the account identifier, the transaction amount, and the function identifier to the account issuer to be processed by the account issuer, and receiving an authorization status notice and an affected transaction amount.

BRIEF DESCRIPTION OF THE DRAWINGS

The present invention is described in detail below with reference to the following drawing figures of which:

FIG. 3 is a diagram depicting the cardholder database illustrated in FIG. 2;

FIG. 4 is a diagram depicting the merchant database illustrated in FIG. 2;

FIG. 5 is a diagram depicting the codes database illustrated in FIG. 2;

FIG. 6 is a diagram depicting the transaction database illustrated in FIG. 2;

DETAILED DESCRIPTION OF THE PREFERRED EMBODIMENTS

Figure 1:
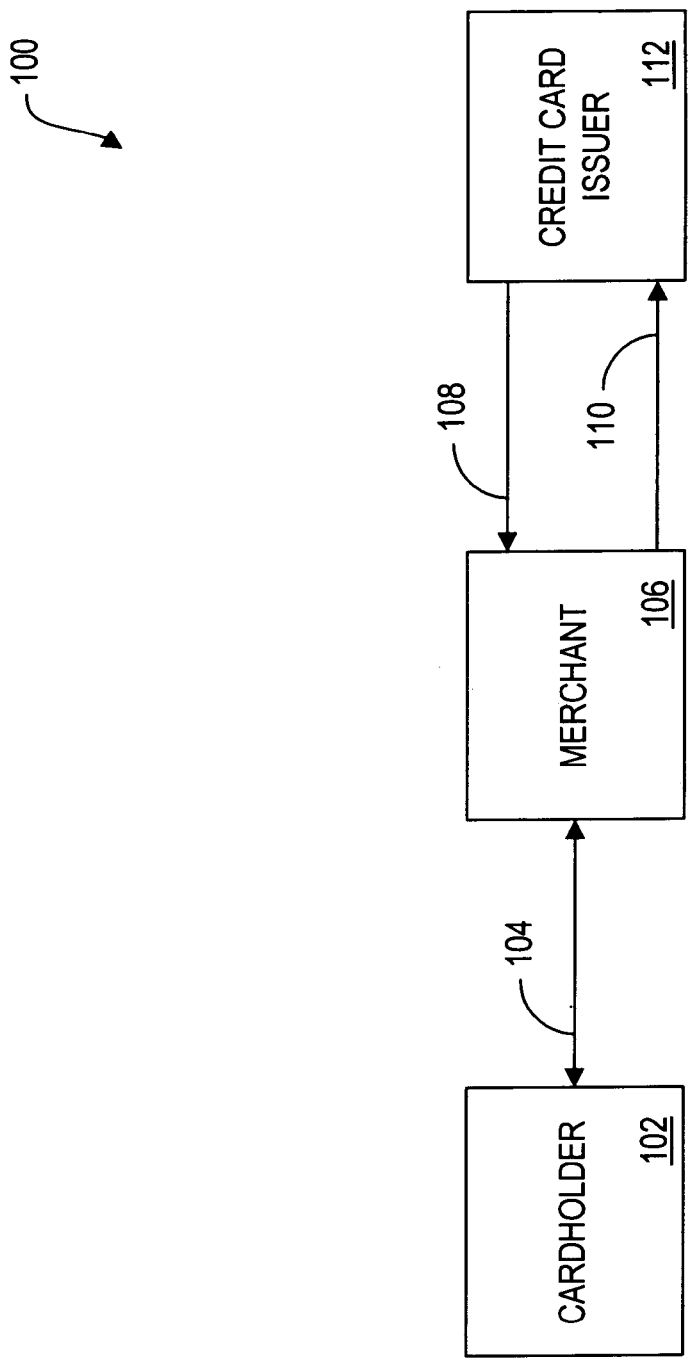
FIG. 1 is a block diagram of a system for establishing and executing functions within a transaction processing system.

The present invention is described in detail below with regard to the drawing figures briefly described above. Like parts are referred to by like reference numerals.

Referring now to FIG. 1, therein depicted is a block diagram of a system for establishing and executing functions within a transaction processing system such as within a credit card transaction processing system. System 100 is configured to allow credit card customers and merchants to use and take advantage of function identifiers and corresponding functions during a particular point-of-sale transaction and which can be executed and processed by an account issuer such as a credit card issuer to affect an account or the transaction and, possibly, the amount that is ultimately charged to or debited from a customer's account. One such function that system 100 will accommodate is the automatic application of a specified discount to a transaction amount during the transaction at the point-of-sale. Functions and their identifiers are discussed in detail throughout the remainder of this section.

Although noted, it should be understood that affecting a transaction is intended to also affect an account to which a particular transaction is to apply. A transaction may be the vehicle by which an account undergoes an operation. For example, the present invention contemplates the execution of a function called for by a corresponding function identifier which results in the account not being charged interest and processing fees relative to the transaction, for a given period of time. These and other processing attributes of the present invention will become readily understood in the following paragraphs.

System 100 allows the use of functions without requiring a credit card customer or merchant to pre-arrange card-usage criteria or relationships. Moreover, system 100 allows the use of functions to affect transactions through conventional, widely-deployed point-of-sale processing systems such as credit card point-of-sale terminals and processing systems. And, system 100 allows the use and execution of functions independently of credit card history data and the like.

From a high level, system 100 operates to allow a cardholder 102 such as a credit or debit card customer to interact with a merchant 106 and a credit card issuer 112 in ways not heretofore provided. Cardholder 102 and merchant 106 exchange information via link 104. Of course, a point-of-sale unit could be designed that has a special function specification button that, when pressed, would notify a credit card processor or issuer that a function is to be communicated and the like. Merchant 106 and credit card issuer 112 exchange information with each other via links 108 and 110, respectively.

Link 104 allows cardholder 102 to exchange transaction-related information such as a credit card number and a function identifier (discussed in detail below in this section). Once received in the course of a point-of-sale transaction, merchant 106 can then re-transmit (possibly via a credit card processor) such credit card number and function identifier information to a credit card issuer for appropriate processing. After such information is received by credit card issuer 112, credit card issuer can process the transaction amount provided by merchant 106, in accordance with the function corresponding to the function identifier originally provided by credit card customer 102. It is important to note that system 100 allows credit card customer 102 to provide the function identifier to merchant 106 and, ultimately, to credit card issuer 1 12 via a point-of-sale unit of the type typically allowing entry of PIN number information. As such, system 100 processes functions without requiring equipment upgrades and without requiring special advance-arrangement plans, other than establishing functions and distributing function identifiers.

Links 104, 108, and 110 are intended to comprise and utilize conventional credit card processing system data links. For example, link 104 preferably involves a point-of-sale unit and network, while links 108 and 110 preferably involve a telecommunications or other network allowing for transaction data communications including the communication of function identifier related information. Of course, any information transmission vehicles could be utilized to allow the functionality of system 100. For example, system 100 contemplates the use of voice response units (e.g., VRUs maintained by a credit card issuer or processor) that may be operated to allow customer 102 to enter a function identifier into a data processing system maintained by credit card issuer 112. Such voice response operation is well known in the transaction processing area especially in the case where personal checks are authorized only after a customer speaks a personal security word into a VRU via a telephone connection. Additionally, other communications mediums such as dedicated telephony call centers having automated and human operators could be set up to handle the communication of transaction and function identifier related information between customer 102, merchant 106, and credit card issuer 112. It is even conceivable that facsimile communications could be used to communicate such transaction and function identifier information. And, of course, system 100 contemplates the use of the Internet as a communications medium that could certainly be deployed for communication of such transaction and function identifier information. The Internet certainly would be preferred in electronic commerce settings in which the present invention is deployed. The use of such alternative communications vehicles will be readily appreciated by those skilled in the art.

Regardless of the communications mediums and topologies that are chosen for implementation, system 100 and the present invention certainly contemplate the use of any communications medium that will allow a customer or a merchant to communicate function and function identifier related information to a processing site for appropriate execution to affect a particular transaction.

As noted above, system 100 operates to execute functions to affect transactions. In the context of the present invention, a function is an operation that can be carried out or executed by a credit card issuer or other data processing authority to bring about a certain result. That is, by executing a particular function such as a discount function, for example, a discount or percentage off a purchase price can be realized during a particular transaction that may involve a credit card or a debit card. Functions according to the present invention include any operation that may affect and/or describe the transaction to bring about a certain benefit. Examples of functions include discounts, dollars off, rebates, special interest arrangements (e.g., no interest for three or six months, etc.), special interest allocation programs such as billing interest to a merchant, the inclusion of customer-based messages on billing statements, and any other form of incentive that may be linked to a transaction.

In the context of the present invention, functions are specified by a labels referred to herein as "function identifiers." The role of a function identifier is to act as a tag for a particular function and, in some instances, may actually be a configured as a pointer to a function. A function identifier serves to allow customers to receive the and present the same in a user-friendly way. For example, a cardholder such as customer 102 can receive a function identifier of "10OFF" from credit card issuer 112. That function identifiers mapped to a function maintained by credit card issuer 112 that will cause a transaction amount to be reduced by 10% to customer 102 to realize a 10% discount on a purchase of his choice. Of course, the function corresponding to the function identifier 10OFF may involve computer programmed operations and, in particular, mathematical operations that credit card issuer executes or runs to effectuate the 10% discount. The function identifier can be printed on customer 102's billing statement and can be easily remembered and presented to a merchant at the point-of-sale and into a POS terminal by manual operation.

Another way to look at function identifiers is to say that they are pointers to functions that are used as a form of communicating the nature of the function to which they point. In the context of a point-of-sale system where function identifiers are communicated via touch-pads or keypads, function identifiers could be codes that may include alpha and numeric strings of characters. In the case the function identifiers are communicated via a voice response unit such as via a speaker independent voice response unit (IVRU), such function identifiers may be represented by DTMF dialing sequences of digits that are keyed by manual operation of a telephone. In the case that function identifiers are communicated via a call center, such function identifiers may be verbal or spoken sequences of words and/or letters and numbers. In the case that function identifiers are communicated via a network such as the Internet, such function identifiers may take the form of hyper-text mark-up language (HTML) scripts or data entered into HTML or CGI data entry screens.

In addition to the aforementioned comments about the present embodiment of the present invention, other examples of functions contemplated by the present invention include, discounts, dollars off, incentive interest rates (e.g., no interest for 6 months), rebate due, or inclusion of customer-specified text based messages (e.g., message codes or personal accounting codes which are retrieved at a point-of-sale and which are to appear on a monthly credit card billing statement).

Also, it should be noted that the present invention contemplates the use and application of multiple functions to affect a single transaction. For example, it is conceivable that a transaction may be affected by a function specified by a merchant (e.g., 10% off) and a function established by a credit card or account issuer (e.g., $30.00 off). Of course, where such multiple functions are to be applied to affect a particular transaction, there may be preferred orderings in terms of the application of such multiple functions. For example, if a merchant's function is a percentage discount function and the account issuer's function is a dollar cost reduction, it would be preferable to the customer to have the percentage discount applied first and the dollar cost reduction applied second. Conversely, it would be preferable to the merchant to have the dollar cost reduction applied first and the percentage discount applied second. In either case, the present invention certainly contemplates the application of one or more functions to affect a transaction.

The processing that occurs to allow the application of multiple functions involves interactive type processing and will be readily appreciated by those skilled in the art of computer programming after reviewing the remainder of this section.

The format and operations related to functions and function identifiers are addressed below in regard to the remaining drawing figures.

Figure 2:
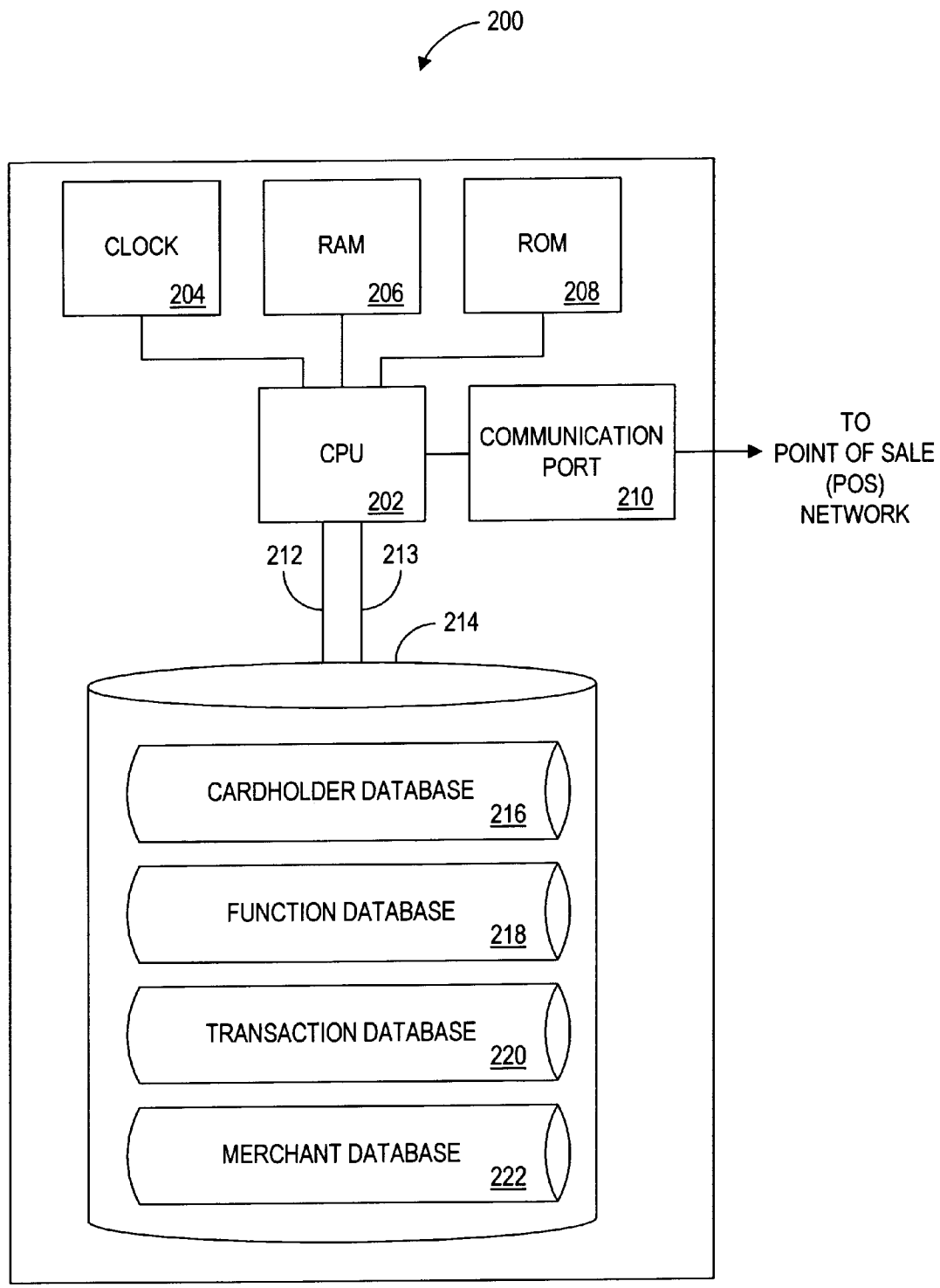
FIG. 2 is a block diagram of a credit card issuer's data processing system.

Referring now to FIG. 2, therein depicted is a block diagram of a credit card issuer's data processing system (also known as an "automatic data processing system" or a "computer system"). In particular, data processing system 200 includes a computer system having a CPU 202, a CLOCK system 204, a RAM 206, a ROM 208, a CLOCK 208, a communications processor and port device 210 (hereinafter abbreviated as "COMM PORT 210"), and a data storage device 214 comprising of a cardholder database 216, a function database 218, a transaction database 220, and a merchants database 222. Of course, these databases may be maintained at one or more physical sites whereby such databases may be said to be distributed databases or to form a distributed database management system. Additionally, the aforementioned components are operatively coupled in a conventional way via couplings 212 and 213. Couplings 212 and 213 may be a bus architecture, a network architecture or any other topology that allows high-speed data communications between a CPU and data storage device 214 which may be a fast disk-based data storage device which are well known in the computer industry.

Data processing system 200 is depicted as a general purpose computer system such as one manufactured by SUN Microsystems known in the industry as the SUN SPARC processor (e.g., a SPARC 1000 running the SUN SOLARIS operating system). The database management system software "DBMS" is preferably implemented in a relational database environment such as one produced by ORACLE Corporation. known in the industry as the ORACLE 7 relational database management system.

The use and operation of the component parts of data processing system 200 including the use and operation of CPU 202, RAM 206, ROM 208, CLOCK 204, COMM PORT 210, couplings 212 and 213, and data storage device 214 will be readily apparent to those skilled in the field of computers and the like.

The interconnections of the component parts making up data processing system 200 will be readily known in the art of computer system design and implementation. Moreover the use of a DBMS like ORACLE 7, including the maintenance, querying, and manipulation of databases and corresponding tables related to a system such as ORACLE 7, will be as readily understood by those skilled in the art of database management technologies.

The actual DBMS structure of the databases forming the bases of relevant tables utilized in the context of the present invention (i.e., database tables 216, 218, 220, and 222 will be discussed in detail below with regard to FIGS. 3, 4, 5, and 6.

It should be noted that COMM PORT 210 is configured to communicate via telecommunications links or some other network topology to a merchant such as merchant 106 (FIG. 1). Electronic communications in the form of data communications will be readily apparent to those skilled in the art. Of course, it should be noted that COMM PORT 210 could be configured to communicate via a networking topology in an open-standards arrangement or in a closed intra-net environment utilizing conventional networking protocols such as TCP/IP and the like.

The operations of CPU 202 to bring about function execution and function identifier to function mapping are discussed below in regard to the remaining drawing figures.

Referring now to FIG. 3, therein depicted is a diagram of a cardholder database 300 of the type illustrated in FIG. 2 and which is maintained at a credit card issuer's site as shown in FIG. 1. In particular, credit card account holder database 300 (hereinafter referred to as "table 300") comprises a database management system table that is preferably used in a relational arrangement whereby table 300 is related to other tables in the particular database management system by way of common columns or table fields. In any case, table 300 is maintained in data storage device 214 (FIG. 2) preferably as a one or more physical disk files stored at one or more credit card issuer sites. Table 300 has a field structure including fields (from table left to right) CARDHOLDER ACCOUNT NUMBER, NAME, ADDRESS, PHONE NUMBER, ORIGINAL CREDIT LINE, and AVAILABLE CREDIT LINE. Of course, table 300's field or column structure is simplified here for purposes of brevity; in actual implementation, many more fields may be used to record other account holder/cardholder information and to record system parameters related to particular records in the database table. The fields form the columns of table 300 and the data records form the rows of table 300. The layout of table 300, including its appearance in FIG. 3, will be readily appreciated by those skilled in the art of database management system design and implementation. It should be noted that the columns and their apparent arrangement in table 300 are merely exemplary to enable one skilled in the art to make and use the invention; no inferences should be drawn that the table structure (logically or physically) as shown is intended to limit the structure that is ultimately implemented.

It should also be noted that while table 300 (as well as the other tables mentioned below) show pecuniary amounts in terms of U.S. dollars, the invention and the present embodiment are not so limited. The present invention is adaptable to any form of currency and forms of money. U.S. dollars are shown and described merely to illustrate the invention and the present embodiment.

In terms of the data and information stored in table 300, three records (i.e., rows) are shown. A first record $R_1$ has been entered into the database management system and into table 300 to store data related to a credit card account holder named TIM JOHNSON who maintains the unique credit card and CARDHOLDER ACCOUNT NUMBER 2222-3333-4444-5555. A second record $R_2$ has been entered into the database management system and into table 300 to store data related to a credit card account holder named SUE CARDHOLDER who maintains the unique credit card and CUSTOMER ACCOUNT NUMBER 9999-9999-9999-9999. A third record $R_3$ has been entered into the database management system and into table 300 to store data related to a credit card account holder named JOHN CHARGER who maintains the unique credit card and CUSTOMER ACCOUNT NUMBER 7777-3333-2222-1111.

In table 300, the account numbers for $R_1$, $R_2$, and $R_3$ are industry common sixteen (16) digit credit card account numbers. Accordingly, the first four (4) digits of each of the account numbers indicate the banking institution that issued the credit card accounts (i.e., the credit issuer). In this case, $R_1$ shows a credit card issuer having a bank code of "2222." Thereafter, the remaining twelve (12) digits of each credit card account number are unique. As such, the sixteen (16) digit account number uniquely identifies a particular cardholder account issued by a credit card issuer. Of course it should be understood that although a sixteen digit account number is common in the credit card field, other credit card and debit card number lengths are certainly envisioned by the present invention. In particular, the present invention would certainly be applicable to a credit card number such as those used by AMERICAN EXPRESS which have fifteen digits.

In addition to the format of the ACCOUNT NUMBER stored in table 300, it should be understood that the same may store a number or alpha-numeric sequence of digits or characters that represent a customer number. Such a customer may be used by a central authority that implements the current invention to identify registered users and the like. Such an arrangement of customer numbers that may map to credit card, debit card or other financial account numbers will be readily apparent to those skilled in the art of database management systems. In particular, if the account number field or column is intended to maintain customer numbers that are distinct from credit card or other financial account numbers and a mapping between the two is desired, a table having at least two columns may be used for the mapping; such a table would include columns for a financial account number and a corresponding customer financial account such as a credit card number.

The field and columns not specifically mentioned above will be readily apparent to those skilled in the art of database design and implementation.

Referring now to FIG. 4, therein depicted is a MERCHANTS database 400 as originally depicted in FIG. 2 at reference numeral 222. In particular, database 400 (hereinafter "table 400") is a relational database table having a column and row arrangement. The columns indicate the fields stored in table 400 and the rows contain the data corresponding to individual records stored in table 400. The columns store merchant information related to MERCHANT ID NUMBER, MERCHANT NAME and MERCHANT ADDRESS. Of course, in actual implementation, other fields of columns may be added to store information related each merchant or for database management system purposes. The addition of such fields and columns will be readily appreciated by those skilled in the art of database management system design and implementation.

Table 400 shows three records containing information about three different merchants.

Record $R_1$ stores data related to a merchant having a MERCHANT ID NUMBER of 12345, a MERCHANT NAME of Macy's and a MERCHANT ADDRESS of 5 Main Street, Town, Conn. Record $R_2$ stores data related to a merchant having a MERCHANT ID NUMBER of 65478, a MERCHANT NAME of Staples and a MERCHANT ADDRESS of 2 Pine Street, City, N.Y. Record $R_3$ stores data related to a merchant having a MERCHANT ID NUMBER of 58749, a MERCHANT NAME of Caldor and a MERCHANT ADDRESS of 123 Purple Ave., Blue, Conn.

Referring now to FIG. 5, therein depicted is a FUNCTION database 500 as originally depicted in FIG. 2 at reference numeral 218. In particular, database 500 (hereinafter referred to as "table 500"), is shown as having a column and row arrangement whereby the columns maintain field data and the rows maintain data records. In table 500, the columns store data related to ASSIGNEE IDENTIFIER, ASSIGNEE, FUNCTION IDENTIFIER, FUNCTION OPERATION, and STATUS. In this context, the term "ASSIGNEE" is meant to include entities (e.g., individual cardholders, merchants, etc.) that are capable of presenting, benefiting from, and utilizing function identifiers and corresponding function to the present invention. The column identified with the label FUNCTION IDENTIFIER stores data representing the codes provided to the respective assignees. The FUNCTION OPERATION column maintains operations and functions to be carried out (i.e., executed) by the account issuer (i.e., the entity maintaining the database management system—credit card issuer 112 in the present embodiment as shown in FIG. 1, for example). The STATUS column stores data related to whether the particular functions have been redeemed or not. Although, the STATUS column indicates a binary status (i.e., REDEEMED/NOT REDEEMED), the column could be configured to store other types of information such as a running count of function redemptions or executions, etc. Also, it should be understood that the column structure shown in table 500 is merely exemplary and not intended to restrict the present invention; those skilled in the art of database management system design and implementation may make many changes including the addition or deletion of fields or columns to effectuate particular system functionality and the like.

As noted above, the rows of table 500 contain data records related to functions and function identifiers maintained in a system such as in system 100 (FIG. 1). For example, record $R_1$ stores data and information related to a function having an ASSIGNEE IDENTIFIER attributable to a credit card account number of 2222-3333-4444-5555 and ASSIGNEE of TIM JOHNSON. The function corresponding to record $R_1$ is coded as BX1239BC and calls for a FUNCTION OPERATION of 5% OFF that has been applied to a transaction such as a point-of-sale transaction that involved TIM JOHNSON. In this case, the FUNCTION IDENTIFIER is an alpha-numeric string of digits. However, the present invention is not so limited; for example, the present invention certainly contemplates the use of numeric strings such as four (4) digit pin-type codes and the like which may be attributed to a particular functions. It is preferred, however, the format that is chosen for the function identifier be one that allows entry and display of the same by a point-of-sale unit such as a credit card or debit card point-of-sale unit or terminal (e.g., such as one manufactured by VERIFONE).

It is important to note that the FUNCTION IDENTIFIER is a label that preferably is distinct from the operation that will be executed in relation to the actual FUNCTION. The present invention is not so limited, however. In fact, the present invention contemplates the use of FUNCTION IDENTIFIERs that are the same as the functions they identify. This case is seen in record $R_5$ where the FUNCTION IDENTIFIER is "NO INT 6 MONTHS" and the FUNCTION OPERATION is the same. Such a function may be used by a credit card customer to realize no interest on a major purchase or on a purchase incented by a credit card issuer. Additionally, such a function may be used by a merchant who purchases the use of such a function from a credit card issuer to incent customers to shop in the merchant's establishment. Accordingly, where the FUNCTION IDENTIFIER and the FUNCTION OPERATION are the same, a system such as system 100 will have to have the ability to understand and decipher the FUNCTION OPERATION and cause the appropriate processing to occur. A database management system envisioned by system 100 will certainly be able to map a FUNCTION OPERATION like "NO INT 6 MONTHS" into appropriate logic to cause a transaction and an appropriate account to bear no interest in relation to the underlying sale for six months after purchase. Such processing and logic will be readily apparent to those skilled in the art.

In addition to allowing the FUNCTION IDENTIFIER and the FUNCTION OPERATION to be the same, the present invention also contemplates the notion that the FUNCTION IDENTIFIER could actually be configured to be a pointer or address to a function operation. Such a configuration will be readily apparent to those skilled in the art.

In addition to the aforementioned comments about table 500 and its records, it should be understood that records $R_1$, $R_2$, and $R_4$ contemplate the use of codes which may be considered "function codes" that may be established and processed in a system such as system 100. Function codes are preferred as they are easily managed by merchants and customers and they are easily and quickly entered into a point-of-sale terminal or communicated to a credit card issuer via some other communications medium (e.g., a telephone call, etc.).

The other records stored in table 500 will be readily appreciated by those skilled in the art of database design and implementation. It is worth noting, however, that the functions stored in table 500 represent operations to be carried out or executed by an account issuer such as a credit card issuer and include, but are not limited to, 5% rebates, cardholder messages transmitted via POS stations to appear on cardholder monthly or periodic billing statements, dollars-off amounts (e.g., $10.00 off a transaction or sales amount of say $50 or more), and possibly, special purchase terms such as no interest periods, no payment periods, etc. In any case, table 500 as used in a system such as system 100 will operate to affect transactions and accounts related thereto.

Referring now to FIG. 6, therein depicted is a transaction database 600 such as the transaction database originally shown in FIG. 2. Transaction database 600 (hereinafter "table 600") is shown as a database table having a column and row structure. The columns contain field data and the rows of table 600 contain actual data records. Table 600 stores information related to (in left to right column order) ACCOUNT NUMBER, DATE, TIME, TRANSACTION AMOUNT, TRANSACTION DESCRIPTOR, MERCHANT ID NUMBER, and MERCHANT NAME.

Generally, table 600 shows four records $R_1$ through $R_4$. The records stored in table 600 store information related to individual point-of-sale transactions involving functions and function identifiers (i.e., where function identifiers were either presented by a customer to a merchant or by a merchant to affect the respective transactions such as by affecting the transaction amount). Of course, as the present invention and embodiment are configured to work within the constraints and capabilities of present day point-of-sale and credit card/debit card transaction processing systems, the present invention would not require table 600 to store a function identifier in the TRANSACTION DESCRIPTOR column; that is, a transaction not involving a function will be stored in table 600 or in some other transaction database table in a conventional and well known way.

More specifically, record $R_1$ contains information related to a transaction involving an ACCOUNT NUMBER of 2222-3333-4444-5555 that occurred on Jan. 1, 1997 at 10:00 am in the amount of $98.00. Additionally, the transaction record indicates that a function identifier or code "BX 1239BC" was presented at the point-of-sale maintained at a merchant named CALDOR having an ID NUMBER of 58749. This transaction could have involved the purchase of clothing such as a shirt whereby the function identifier BX1239BC was intended to apply and to affect the transaction and, in particular, the transaction amount by reducing the same by 5% (i.e., indicated as 5% OFF Purchase Price as illustrated in related table 500 at record $R_1$—FUNCTION IDENTIFIER BX1239BC associated with ASSIGNEE IDENTIFIER or ACCOUNT NUMBER 2222-3333-4444-5555). The operations corresponding to taking 5% off the purchase price of $98.00 will be readily apparent to those skilled in the art. However, for purposes of clarity the TRANSACTION AMOUNT of $98.00 is to be multiplied by 0.95 to realize a 5% off discounted price which will thereafter appear on TIM JOHNSON's monthly statement (see related table 300—account number 2222-3333-4444-5555 corresponds to NAME or cardholder TIM JOHNSON). Of course, the present invention contemplates the notion that the function corresponding to the particular TRANSACTION DESCRIPTOR could be applied or executed immediately at the point-of-sales whereby the affected transaction amount of $98 less a 5% discount could be manifested or displayed by the LED display often found on point-of-sale terminals. Accordingly, the foregoing discussion clearly illustrates the present invention's ability to provide for functions which may be presented and processed to affect transactions such as the transaction amounts involved within transactions.

The function identifier of BX1239BC could have been presented by TIM JOHNSON after he received the same from his credit card issuer. The function identifier could have been force issued (i.e., sent without request by the cardholder) by Mr. Johnson's credit card issuer via a billing statement or some other distribution such as via an electronic mail item sent via the Internet. Also, the function identifier could have been sent to Mr. Johnson upon his request from his credit card issuer in exchange for a fee or the like or as part of some general reward program. For a further discussion of the nature of the submission of a function identifier or function code to a cardholder, see the discussion of FIG. 9 below.

Alternatively, the function identifier could have been presented by a merchant (in this case CALDOR) as a special purchase incentive or loyalty building tool. In any case, the effect of the use of such function identifier is to cause Mr. Johnson's credit card issuer to execute a corresponding function that provides a 5% discount on Mr. Jonhson's purchases.

Record $R_2$ records a transaction involving account number 9999-9999-9999-9999 and a TRANSACTION DESCRIPTOR in the form of a text string "TAX DEDUCTION." In other words, SUE CARDHOLDER, the account owner or cardholder having account number 99999999-9999-9999 as indicated by related table 300 had arranged for a function identifier and corresponding function to specify text strings (see related table 500) that can be entered into a point-of-sale unit at the point-of-sale corresponding to the recorded transaction (i.e., a message code). In this way, the present invention, by utilizing conventional point-of-sale systems in a novel way, will allow cardholder or account owners to self-specify transaction traits and explanations at the point-of-sale thereby easing personal accounting processes such as expense reporting for business purposes and the like (e.g., specifying codes mapped to account codes used in popular software packages such as those manufactured by Intuit known as Quicken or QuickBooks).

Record $R_4$ records a transaction involving account number 4444-4444-4444-4444 and a TRANSACTION DESCRIPTION in the form of a text-based function identifier which, in the system being described, is the same as the corresponding function operation to be executed (see table 500). Accordingly, the owner of the specified account number, will be able to realize a special buying incentive commonly used in retail merchandising settings—the reduced or no interest for a limited time buying plan. Such buying plans often are used with big-ticket purchases and the like. Record $R_4$ in conjunction with table 500, illustrate the flexibility of the present invention in terms of the function identifiers that may be used and processed to ultimately effectuate certain affects on transactions. It should be clear that all that is required of a function identifier is that the same be mapped (i.e., configured to as a key in a database system to locate other, related data) to a specified function that is to be executed to bring about a certain result. In other words, record $R_4$ illustrates that a transaction can be processed as usual and can be enhanced by allowing a function identifier to entered at a point-of-sale and mapped to a corresponding function maintained by a credit card issuer to result in a definite and certain affect on the transaction or the account to which the transaction relates.

Based on the foregoing specific discussion of table 600 and, in particular, records $R_1$, $R_2$, and $R_4$, it should be readily appreciated that functions according to the present invention are used to affect transactions. Accordingly, a detailed discussion of record $R_3$ is omitted. It should be noted, however, that the operations that must be carried out or executed to bring about the functionality corresponding to particular functions will be readily apparent to those skilled in the art of computer programming. For example, discounts will involve the mathematical multiplication of a transaction amount by a discount factor (e.g., 5% or 10%), whereas dollars-off discounts will usually involve the mathematical subtraction of a specified sum from a transaction amount. Special buying incentives such as a reduced interest programs will involve the multiplication and compounding of interest at specified rates versus standard applied interest rates. Moreover, the actual functions that are to affect transactions may be set by merchants such as pre-purchased discounts as purchasing incentives and the like, by customers desiring to record transaction information such a text strings and the like, and by credit card issuers as incentives to utilize and/or activate credit card accounts. In any event, the functions contemplated by the present are intended to be processed utilizing conventional and readily available point-of-sale processing systems that allow for entry of alpha and numeric data.

Figure 7A:
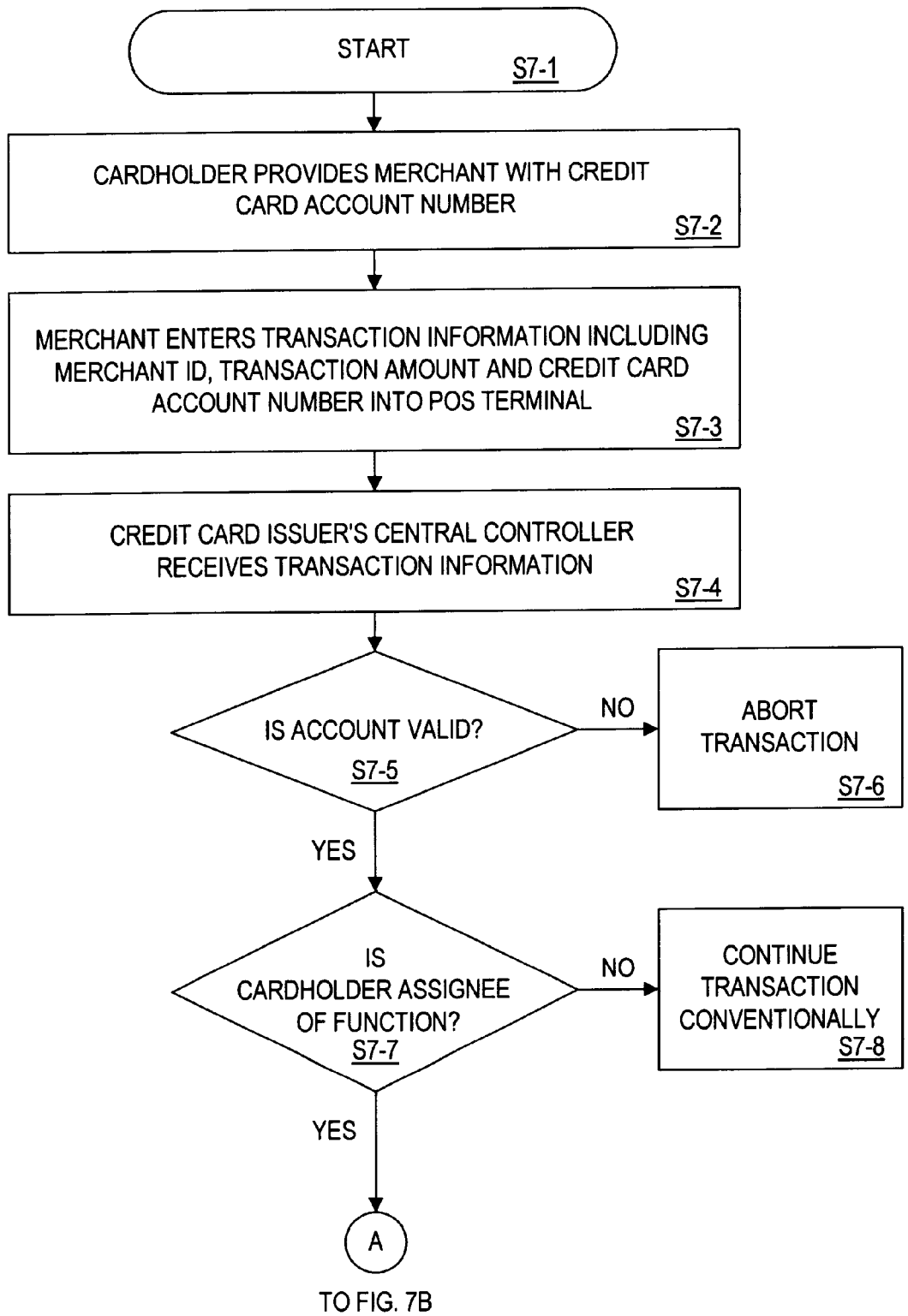
FIG. 7A is a flow chart illustrating a process carried out according to a preferred embodiment of the present invention.
Figure 7B:
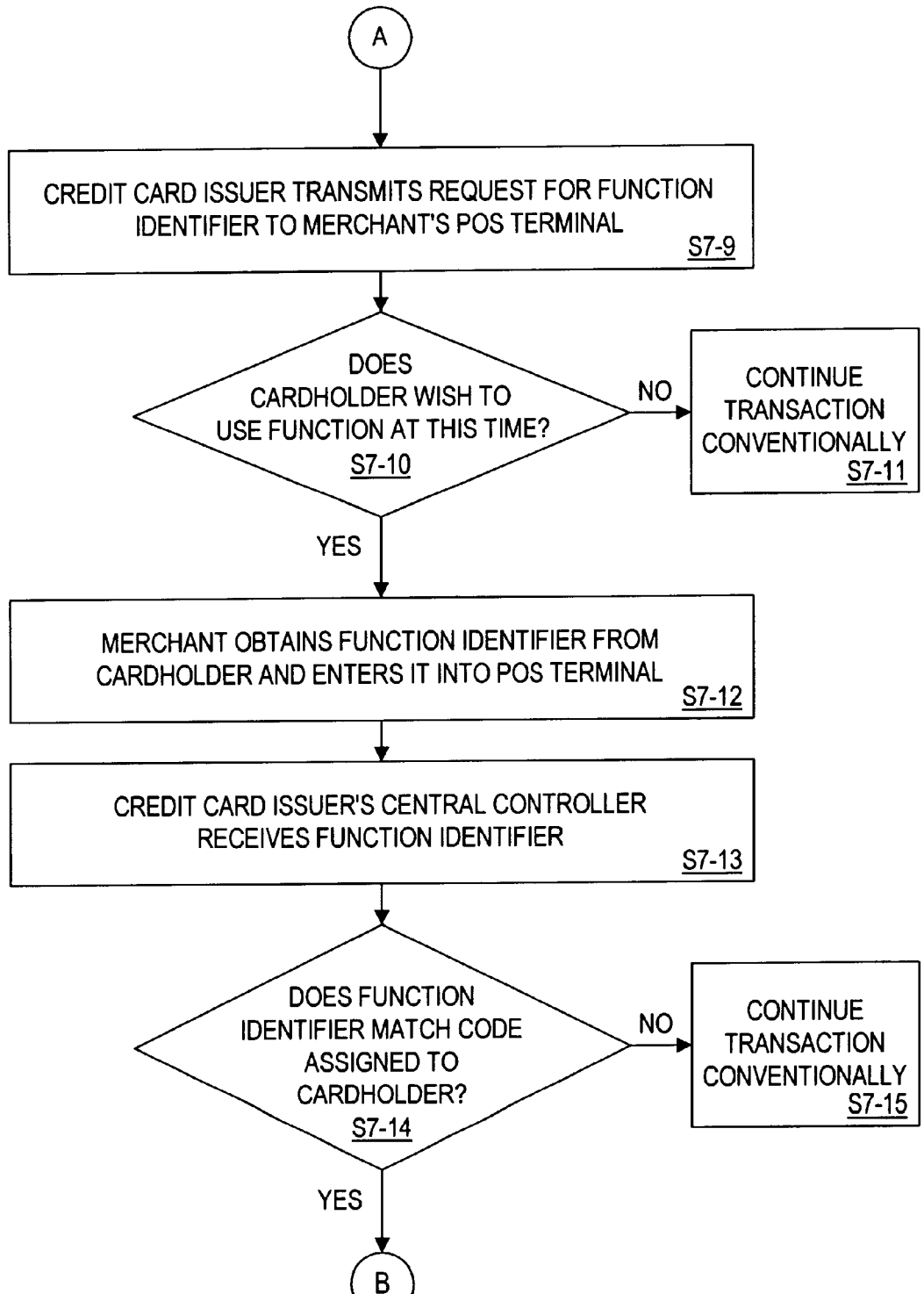
FIG. 7B depicts further steps carried out by the process started in FIG. 7A.
Figure 7C:
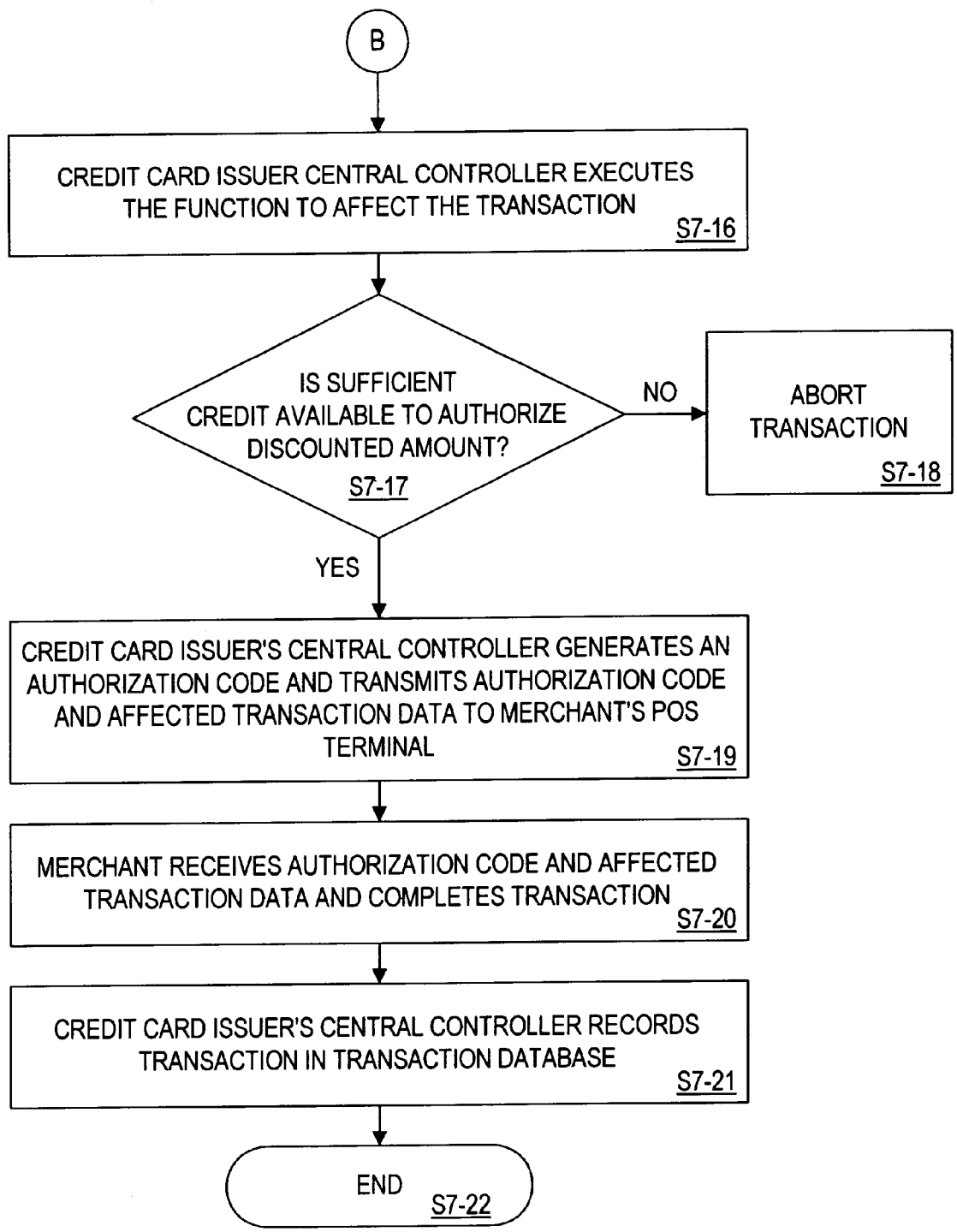
FIG. 7C depicts further steps carried out by the process started in FIG. 7A.

Referring now to FIGS. 7A–7C, therein depicted are flow charts illustrating a first embodiment of a process for processing or otherwise executing functions within a credit card or debit card processing system utilizing point-of-sale data entry systems such as the system depicted in FIG. 1. The process depicted in FIGS. 7A–7C is, in part, intended to be carried out by the data processing system illustrated in FIG. 2 and described above. The process depicted in FIGS. 7A–7C also is intended to illustrate the steps carried out by a credit card issuer, a merchant, and a cardholder during a particular transaction. Moreover, the process depicted in FIGS. 7A–7C contemplates the use and operation of functions based on codes that are presented and processed during a particular point of sale transaction. Of course, the term "code" in this context is meant to indicate a function identifier that corresponds to a particular function to be carried out to affect a particular transaction in a specified way.

Processing starts at Step S7-1 and immediately proceeds to Step S7-2 where a cardholder provides a merchant with a credit card account number during the course of a transaction. Thereafter, at Step S7-3, the merchant enters transaction information such as a merchant ID, a transaction amount and the credit card account number into a point-of-sale (POS) terminal as discussed above in regard to FIG. 1.

Processing then proceeds to Step S7-4 where the credit card issuer's central controller or data processing system receives the transaction information entered by the merchant into the POS terminal.

At Step S7-5, the credit card issuer will determine if the credit card and the account are valid (e.g., is the credit card number one that was issued by the particular credit card issuer, etc.). If not, the transaction will be aborted in a conventional way (Step S7-6).

If the account is valid, at Step S7-7, a determination is made as to whether the cardholder is an assignee of a function (i.e., is the cardholder's account number associated with a function operation that is to be executed to bring about a certain result?). If not, processing proceeds to Step S7-8 where the transaction will be processed in a conventional way.

If the cardholder is an assignee of a function, then processing proceeds to Step S7-9 as shown at the top of FIG. 7B.

At Step S7-9, the credit card issuer will transmit a request (e.g., "CODE?" or "FUNCTION?") to the merchant's POS terminal for display thereon. Thereafter, at Step S7-10, a decision by the cardholder can be made whether or not to use the function during the present transaction to affect the present transaction or the cardholder's account. If not, processing proceeds to Step S7-11 where a conventional process for handling the transaction will commence without incorporating a function or processing related thereto.

At this point it should be noted that the merchant could also be the party that may apply a function to a given transaction to bring about a certain result. The present invention is not restricted to having only the cardholder determine to use a function or not.

If the execution of function is intended by the cardholder, processing proceeds to Step S7-12 where the merchant obtains a function identifier from the cardholder and causes it to be entered into the merchant's POS terminal. The act of entering the function identifier into the POS terminal would be similar to entering a PIN (personal identification number) into a POS unit to verify identification during a point-of-sale transaction, etc.

Thereafter, at Step S7-13, the credit card issuer's data processing system 200 receives the function identifier entered during Step S7-12. Processing then proceeds to Step S7-14, where the data processing system 200 will determine if the entered function identifier matches or maps to a function stored in a function database (see e.g., FIG. 5) in relation to the account number of the cardholder that was earlier received in the process. If not, processing proceeds to Step S7-15, where the transaction may be handled in a conventional, non-function-enabled manner or some other fixed cycle of re-entry requests could be executed.

If there is a function identifier match and a function identifier and function operation mapping as determined from database operations on a database table such as table 500, processing proceeds to Step S7-16, where the credit card issuer's data processing system 200 will execute the function operation corresponding to the function identifier and carry out necessary operations (e.g., mathematical multiplication, etc.) to calculate a discounted price, or some other effect on the transaction thereby directly affecting the transaction during the POS transaction.

Thereafter, at Step S7-17, a determination is made as to whether there is sufficient credit in the cardholder's account to allow the credit card issuer to authorize the discounted price or the affected transaction amount. If not, at Step S7-18, the transaction will be aborted in a conventional way.

Although the process depicted so far contemplates a discount as the desired affect on the transaction, other effects can be easily substituted. Such substitution will be apparent to those skilled in the art of computer programming and, in particular, database management system programming.

If sufficient credit is available, processing proceeds to Step S7-19 at the top of FIG. 7C.

At Step S7-19, the credit card issuer's data processing system generates an authorization code and transmits the same and the discounted price or the affected transaction amount to the merchant's POS terminal. At Step S7-20, the merchant receives the authorization code and the discounted price and completes the transaction in a conventional way (i.e., via credit card transaction processing systems known in the art).

At Step S7-21, the credit card issuer's data processing system 200 records the transaction in a transaction database for later processing during a billing cycle.

Processing ends at Step S7-22.

It is important to note that the process depicted in FIGS. 7A–7C clearly illustrates the ability of the present invention to allow for entry of a function identifier at the point-of-sale by utilizing conventional POS terminals. Moreover, a function identifier such as a function code entered at the point-of-sale may be either entered by a merchant (e.g., a merchant that had earlier purchased a particular type of function code from a credit card issuer) or by a cardholder to affect the transaction and, in particular, the transaction amount. The affect on the transaction, as discussed in detail above, may involve a price discount or the like which can occur during the course of the transaction as opposed to realizing an effect on a billing statement later in time.

Figure 8A:
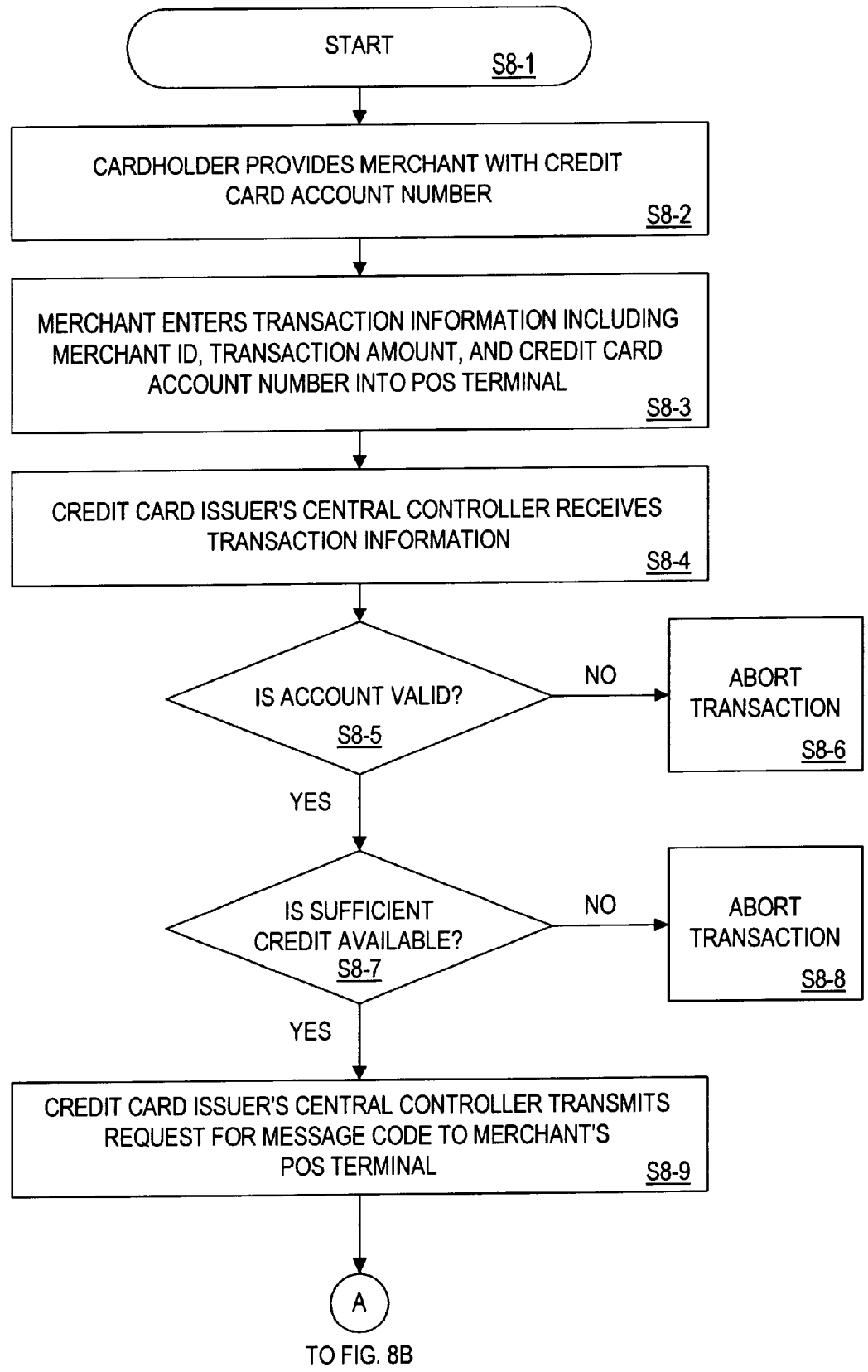
FIGS. 8A and 8B are flow charts illustrating a process carried out according to another preferred embodiment according to the present invention.
Figure 8B:
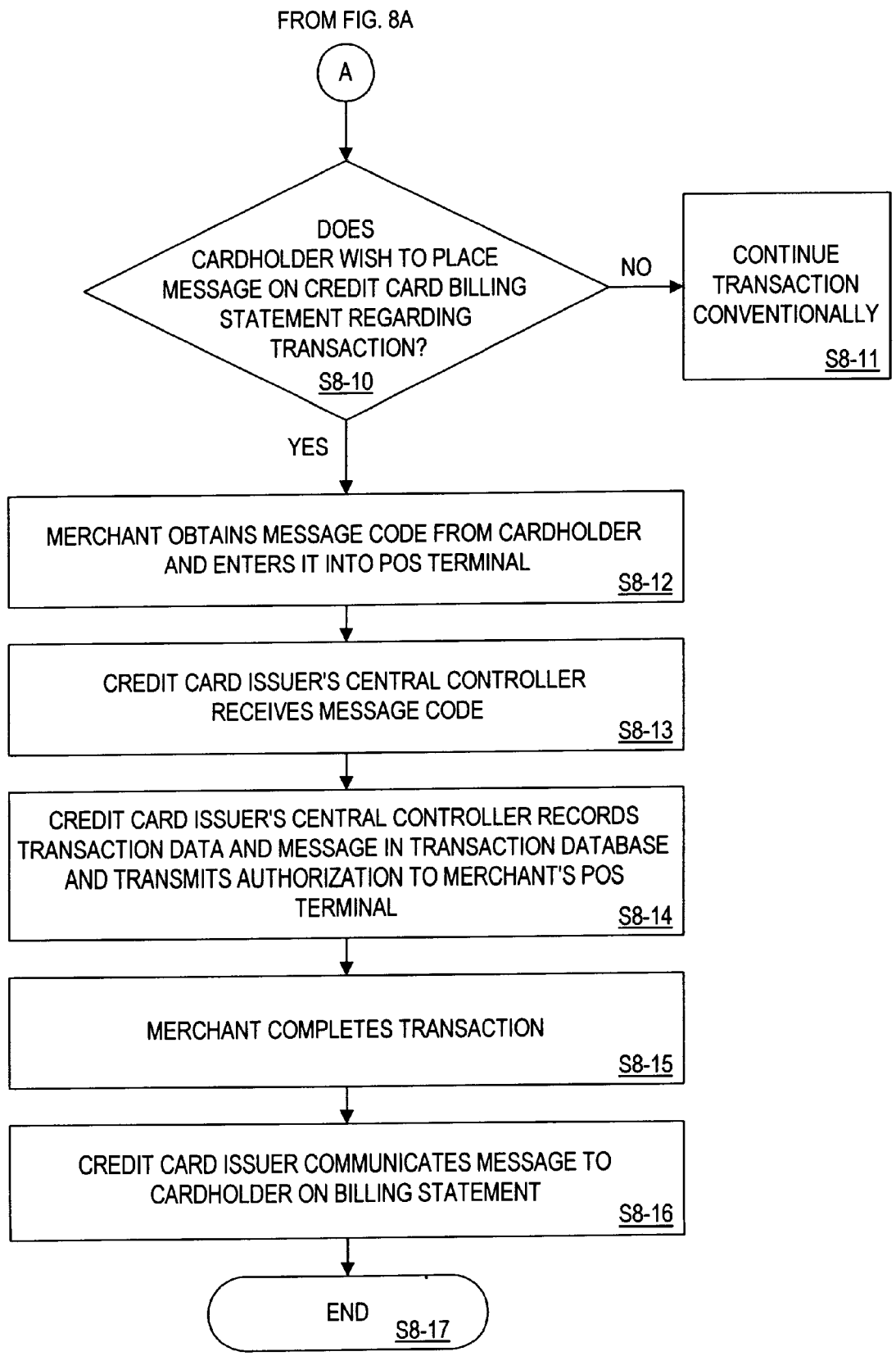

Referring now to FIGS. 8A and 8B, therein depicted is another preferred embodiment for processing and executing functions and, in particular, functions that cause messages or message codes to be processed and recorded during point-of-sale transactions. The process depicted in FIGS. 8A and 8B are intended to be carried out, at least in part, by a credit card issuer's data processing system 200 and during a particular point-of-sale transaction. More particularly, the process depicted in FIGS. 8A and 8B are intended to ultimately allow cardholders to enter messages about their transactions into POS terminals for later appearance of such messages on the cardholders' billing statements. Such messages may take the form of short codes that may be used to identify personal characteristics about a transaction such as personal accounting codes, etc. Additionally, it is envisioned that such message codes may be established by a cardholder to match his personal accounting codes used within an accounting system such as QUICKEN or QUICK BOOKS by Intuit Software.

Processing starts at Step S8-1 and immediately proceeds to Step S8-2.

At Step S8-2, a cardholder provides a merchant with a credit card account number by presenting his credit card as the payment vehicle during the transaction. Processing then proceeds to Step S8-3, where the merchant enters transaction information including a merchant ID, a transaction amount, and the credit card account number into a POS terminal.

Next, at Step S8-4, the credit card issuer's data processing system 200 receives the transaction information entered and transmitted during Step S8-3. Thereafter, at Step S8-5, a determination is made as to whether the cardholder's account is valid. If not, the transaction is aborted at Step S8-6.

If the cardholder's account is valid, processing proceeds to Step S8-7, where a determination is made as to whether there is sufficient credit available to absorb the transaction amount. If not, at Step S8-8, the transaction is aborted.

If sufficient credit is available to absorb the transaction amount, processing proceeds to Step S8-9, where the credit card issuer's data processing system 200 transmits a function identifier request to the merchant's POS terminal. Such a request may take the form of a text message such as "Code?" or "Message?" and is intended to be manifested or displayed on the merchant's POS terminal.

Processing then proceeds to Step S8-10 at the top of FIG. 8B. There, a determination may be made by the cardholder as to whether he intends to use or incorporate a message-type function identifier which will later appear on his billing statement. If not, at Step S8-11, the transaction will be handled in a conventional manner.

If the cardholder desires to incorporate a message on his billing statement, processing proceeds to Step S8-12 where the merchant obtains a message from the cardholder and causes the same to be entered into the POS terminal. It is preferred that a special character be used to signify the entry of a text-based message as opposed to a function identifier that is to invoke some special function operation such a mathematical operation. Such a special character may be the asterisk and may be used to enter a string of characters such as "*BEXP" to indicate a business expense item. The string "BEXP" will be recorded on a cardholder's billing statement in a row containing line-item information about the particular transaction to which the message pertains.

Of course, special characters need not be used to signify messages. Special signifying characters, however, will allow a system such as system 100 to immediately recognize that a message string has been inputted thereby saving look-up time that normally may occur to map a function identifier to a particular function operation. The use of such a special character as a trigger for a corresponding type of function will be apparent to those skilled in the art.

In any case, processing proceeds to Step S8-13 where the credit card issuer's data processing system 200 receives the function identifier that is to form the basis of a message or a message code established by the cardholder.

At Step S8-14, the credit card issuer's data processing system records the transaction information and the entered function identifier in a transaction database and transmits an authorization notice to the merchant's POS terminal 106. Thereafter, the merchant completes the transaction Step S8-15.

At Step S8-16, the credit card issuer will communicate the function identifier or message to the cardholder via the cardholder's billing statement.

Processing ends at Step S8-17.

Accordingly, the process depicted in FIGS. 8A and 8B will allow a cardholder to enter messages directly on his billing statement via conventional POS terminals and processing systems. Such messages will enhance the use of credit cards and the like as cardholder's will be able to track expenses and record notes related to transactions at the point-of-sale when knowledge about the transaction is fresh. As such, the process depicted in FIGS. 8A and 8B, will allow cardholders to affect their transactions with critical accounting and expense tracking information at the point-of-sale.

Figure 9:
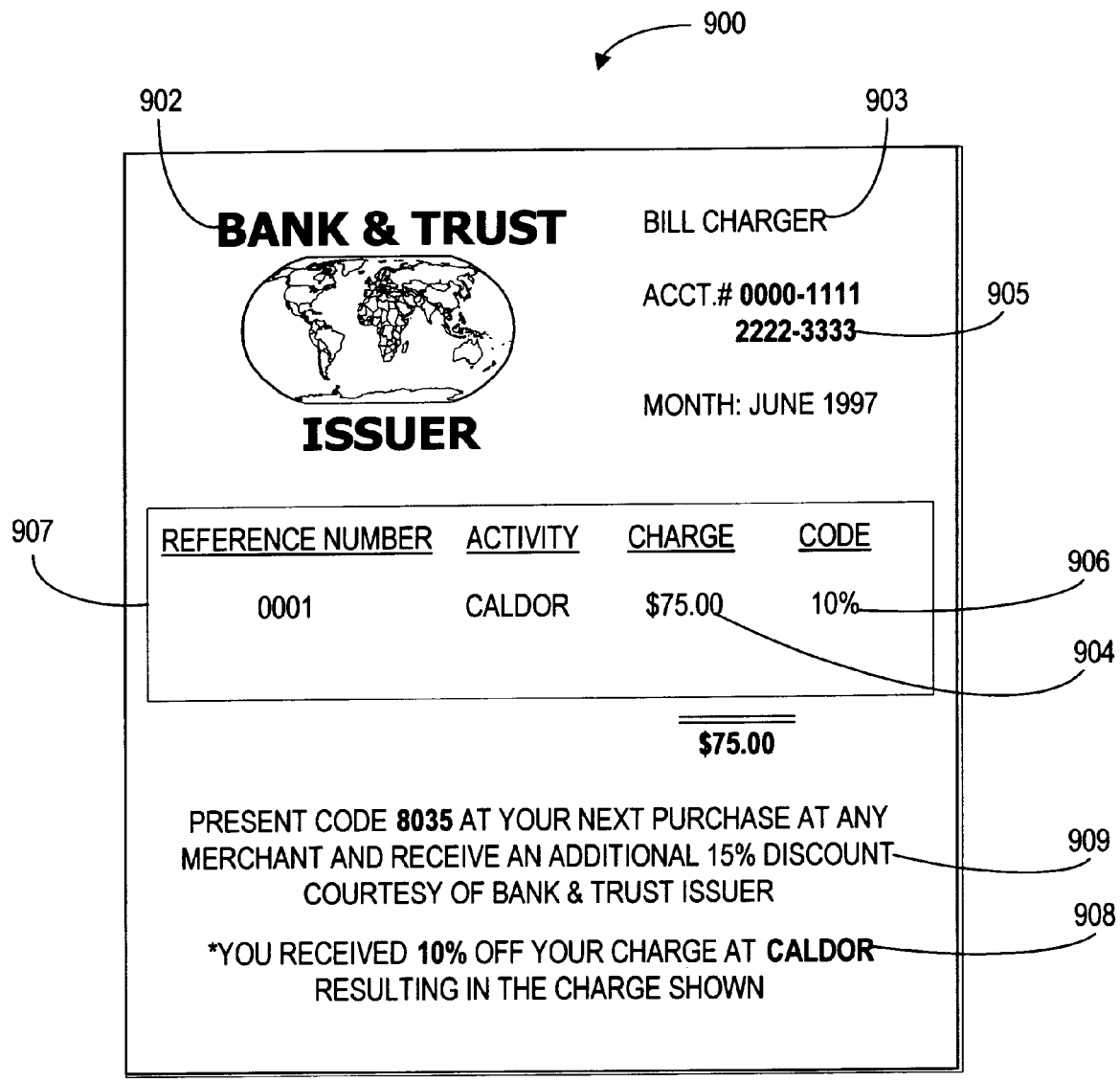
FIG. 9 is an illustration of a cardholder's monthly billing statement according to the present invention.

Referring now to FIG. 9, therein depicted is a cardholder's monthly billing statement according to the present invention. In particular, statement 900 resembles a typical monthly billing statement with the addition of function identifier data in the form of code information and corresponding notices printed on statement 900 to indicate the activities carried out or executed by credit card issuer 902 in accordance with that code information. As such, statement 900 is a paper form that is generated in a conventional way by or on behalf of credit card issuer 902 and is usually sent via a mail service to bill charger 903 who is the owner of an account number 905. Of course, as billing systems have advanced, the present invention certainly envisions the day when customers will regularly receive their bills (and billing statements like statement 900) electronically such as by way of a network (e.g., via the Internet, the telephone network, etc.). Many banks such as CitiBank now offer private network-based transport of financial account details and statements. Accordingly, the implementation details necessary to transport or otherwise deliver a billing statement like statement 900 to a recipient or account owner electronically will be readily apparent to those skilled in the art.

A reference line 907 includes information about a transaction in which bill charger 903 used his credit card at a point-of-sale. Reference line 907 includes information about a point-of-sale purchase at the CALDOR store having reference number 0001. Moreover, the purchase amount or transaction amount was $83.33 and was affected by a function having a corresponding function identifier 906 to realize a 10% discount or an actual charge amount of $75.00 after application of the discount. In particular, credit card issuer 902 has a data processing system wherein a mathematical operation is carried out to multiply the original $83.33 by 0.9 to realize a 10% discount or $75.00. That operation and the effect of the discount on the purchase amount is indicated on statement 900 at note 908.

It is important to note that the way that the affect of a particular function (e.g., 10% off) is manifested on statement 900 can vary depending on design requirements. For example, if the function to be applied to a given transaction is one purchased from an issuer by a merchant, then statement 900 may merely show the actual price charged as opposed to details about the application of the function. Additionally, statement 900 could be produced to indicate the original price, the affected price, or any other information that is desired.

Note 909 also indicates a new function in the form of a function code for bill charger 903 to use at his next purchase at any merchant who accepts his credit card to receive an additional 15% off his entire purchase. In this case, the function specified in note 909 is one issued by the credit card issuer. Functions represented by function identifier 906 and the new function indicated by the function identifier in note 909 will allow credit card issuers and merchants to realize increased card use and purchasing, respectively. Accordingly, having fully described the present invention by way of example with reference to the attached drawing figures, it will be readily appreciated that many changes and modifications may be made to the invention and to any of the exemplary embodiments shown and/or described herein without departing from the spirit or scope of the invention which is defined in the appended claims.

What is claimed is:

1. A method for determining the terms of a transaction, comprising the steps of:

receiving, from a POS terminal, a request to process a transaction, the request including a transaction amount, an account identifier and a function identifier, the account identifier corresponding to an account, and the function identifier corresponding to an operation defining special purchase terms;

recording data representing a link between the function identifier and the transaction;

transmitting, to the POS terminal, an authorization code in response to the request; and processing the transaction in accordance with the operation to affect the account.

2. The method of claim 1 wherein the operation represents application of a discount amount.

3. The method of claim 1 wherein the operation represents application of a percentage discount.

4. The method of claim 1 wherein the operation represents application of a special interest arrangement.

5. The method of claim 1 wherein the operation represents a period of reduced payment.

6. A method for identifying the terms of a transaction at a point-of-sale, the method comprising the steps of:

receiving an account identifier and a function identifier, the account identifier corresponding to an account, the function identifier corresponding to an operation defining special purchase terms;

determining a first transaction amount;

transmitting a request for authorization, the request including the account identifier, the function identifier and the first transaction amount;

receiving an authorization notice including a second transaction amount; and processing the transaction based on the second transaction amount.

7. The method of claim 6, further comprising the step of transmitting a request for the function identifier.

8. A method for processing a cardholder message, the method comprising the steps of:

receiving a request to process a transaction, the request including a transaction amount, an account identifier and a cardholder message identifier representing a cardholder message;

establishing an association between the cardholder message and the transaction; and storing at least one of the cardholder message identifier and the cardholder message, thereby indicating the association between the cardholder message and the transaction.

9. The method of claim 8 wherein the cardholder message is a message code selected from a set of predefined message codes.

10. The method of claim 8, further comprising the step of transmitting a request for the cardholder message.

11. The method of claim 8, further comprising outputting the cardholder message on a billing statement associated with the account identifier.

12. A credit card central controller for determining the terms of a transaction, the credit card central controller comprising:
a processor;
a memory connected to said processor storing a program to control the operation of said processor;
the processor operative with the program in the memory to:
receive, from a POS terminal, a request to process a transaction, the request including a transaction amount, an account identifier and a function identifier, the account identifier corresponding to an account, and the function identifier corresponding to an operation defining special purchase terms;
record data representing a link between the function identifier and the transaction;
transmit, to the POS terminal, an authorization code in response to the request; and
process the transaction in accordance with the operation to affect the account.

13. A POS terminal for identifying the terms of a transaction at a point-of-sale, the POS terminal comprising:
a processor;
a memory connected to the processor storing a program to control the operation of the processor;
the processor operative with the program in the memory to:
receive an account identifier and a function identifier, the account identifier corresponding to an account, the function identifier corresponding to an operation defining special purchase terms;
determine a first transaction amount;
transmit a request for authorization, the request including the account identifier, the function identifier and the first transaction amount;
receive an authorization notice including a second transaction amount; and
process the transaction based on the second transaction amount.

14. The POS terminal of claim 13, wherein the processor is further operative with the program to transmit a request for the function identifier.

15. A credit card central controller for processing a cardholder message, the credit card central controller comprising:
a processor;
a memory connected to the processor storing a program to control the operation of the processor;
the processor operative with the program in the memory to:
receive a request to process a transaction, the request including a transaction amount, an account identifier and a cardholder message identifier representing a cardholder message;
establish an association between the cardholder message and the transaction; and
store at least one of the cardholder message identifier and the cardholder message, thereby indicating the association between the cardholder message and the transaction.

16. The credit card central controller of claim 15, wherein the processor is further operative with the program to transmit a request for the cardholder message.

17. The credit card central controller of claim 15, wherein the processor is further operative with the program to output the cardholder message on a billing statement associated with the account identifier.

18. A credit card central controller for determining the terms of a transaction, comprising:
means for receiving, from a POS terminal, a request to process a transaction, the request including a transaction amount, an account identifier and a function identifier, the account identifier corresponding to an account, and the function identifier corresponding to an operation defining special purchase terms;
means for recording data representing a link between the function identifier and the transaction;
means for transmitting, to the POS terminal, an authorization code in response to the request; and
means for processing the transaction in accordance with the operation to affect the account.

19. A POS terminal for identifying the terms of a transaction at a point-of-sale, comprising:
means for receiving an account identifier and a function identifier, the account identifier corresponding to an account, the function identifier corresponding to an operation defining special purchase terms;
means for determining a first transaction amount;
means for transmitting a request for authorization, the request including the account identifier, the function identifier and the first transaction amount;
means for receiving an authorization notice including a second transaction amount; and
means for processing the transaction based on the second transaction amount.

20. The POS terminal of claim 19, further comprising means for receiving a request for the function identifier.

21. A credit card central controller for processing a cardholder message, the credit card central controller comprising:
means for receiving a request to process a transaction, the request including a transaction amount, an account identifier and a cardholder message identifier representing a cardholder message;
means for establishing an association between the cardholder message and the transaction; and
means for storing at least one of the cardholder message identifier and the cardholder message, thereby indicating the association between the cardholder message and the transaction.

22. The credit card central controller of claim 21, further comprising means for transmitting a request for the cardholder message.

23. The credit card central controller of claim 21, further comprising means for outputting the cardholder message on a billing statement associated with the account identifier.

24. A computer-readable storage medium encoded with processing instructions for implementing, a method for determining the terms of a transaction, said processing instructions for directing a computer to perform the steps of:
receiving, from a POS terminal, a request to process a transaction, the request including a transaction amount, an account identifier and a function identifier, the account identifier corresponding to an account, and the function identifier corresponding to an operation defining, special purchase terms;

recording data representing a link between the function identifier and the transaction;

transmitting, to the POS terminal, an authorization code in response to the request; and processing the transaction in accordance with the operation to affect the account.

25. A computer-readable storage medium encoded with processing instructions for implementing a method for identifying the terms of a transaction at a point-of-sale, said processing instructions for directing a computer to perform the steps of:

receiving an account identifier and a function identifier, the account identifier corresponding to an account, the function identifier corresponding to an operation defining special purchase terms;

determining a first transaction amount;

transmitting a request for authorization, the request including the account identifier, the function identifier and the first transaction amount;

receiving an authorization notice including a second transaction amount; and processing the transaction based on the second transaction amount.

26. A computer-readable storage medium encoded with processing instructions for implementing a method for processing a cardholder message, said processing instructions for directing a computer to perform the steps of:

receiving a request to process a transaction, the request including a transaction amount, an account identifier and a cardholder message identifier representing a cardholder message;

establishing an association between the cardholder message and the transaction; and storing at least one of the cardholder message identifier and the cardholder message, thereby indicating the association between the cardholder message and the transaction.

* * * * *